May 31, 1955     S. J. MARKOWSKI     2,709,337
BOUNDARY LAYER CONTROL FOR THE DIFFUSER OF A GAS TURBINE
Filed March 28, 1952
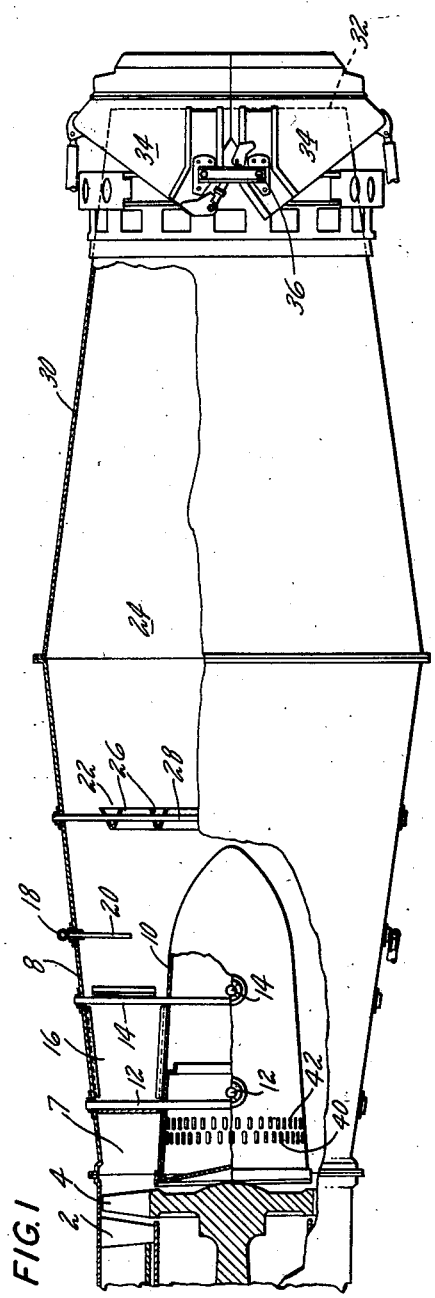
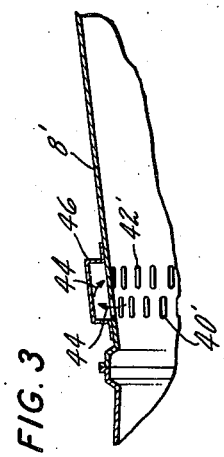
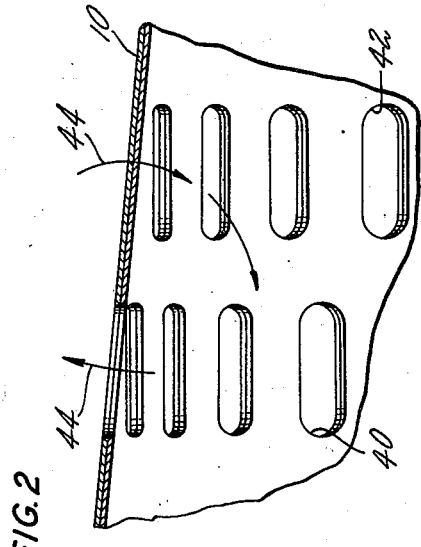
INVENTOR
STANLEY J. MARKOWSKI
BY Charles A. Warren
ATTORNEY

United States Patent Office 2,709,337
Patented May 31, 1955

2,709,337

BOUNDARY LAYER CONTROL FOR THE DIFFUSER OF A GAS TURBINE

Stanley J. Markowski, East Hartford, Conn., assignor to United Aircraft Corporation, East Hartford, Conn., a corporation of Delaware Application March 28, 1952, Serial No. 279,008

2 Claims. (Cl. 60—35.6)

This invention relates to boundary layer control and particularly to an arrangement for energizing the boundary layer where the flow tends to break away from a surface.

One feature of the invention is an arrangement for energizing the boundary layer by the use of rows of holes spaced apart in the direction of flow and interconnected externally of the flow path to establish fluid flow from the holes in one row to the holes in an adjacent row. Another feature is the use of these holes in the wall of a diffuser to permit a more rapid diffusion. One feature is the location of such holes in the inner wall of an annular diffuser where the holes in the spaced rows will be interconnected by the space within the inner wall.

In gas turbines where afterburners are used for additional thrust the exhaust gas from the turbine is diffused before afterburning with additional fuel occurs. This diffuser must be efficient while afterburning is occurring and also during turbine operation without afterburning. Furthermore, it is desirous to maintain the diffuser length at a minimum to keep the overall engine dimensions as low as possible. As the diffuser is shortened, the angle of divergence of the walls must increase to produce the desired pressure rise through the diffuser. With steep walls however the flow tends to break away from the walls with a reduction in diffuser efficiency. This breaking away may be reduced or eliminated to a great extent by energizing the boundary layer. One feature of the invention is the provision, in at least one wall of the diffuser downstream of the turbine, of vortex producing devices for energizing the boundary layer.

The discharge from the turbine is annular and there is, downstream of the turbine, a tailcone which forms an inner wall for the annular path for the flow from the annular turbine exhaust. The presence of this cone causes uneven distribution of afterburner combustion by reason of the turbulence set up adjacent the end of the cone. A feature of the invention is the provision of boundary energizing means on the tailcone to improve the flow and thereby improve the combustion. More specifically, a feature of the invention is the incorporation of axially spaced circumferentially extending rows of holes through the walls of the tailcone for the purpose of energizing the boundary layer to improve the flow over the surface of the cone and thereby eliminate to a great extent the turbulence in the flow at the tip of the cone. This feature is of importance in engines without afterburners.

Other objects and advantages will be apparent from the specification and claims, and from the accompanying drawing which illustrates an embodiment of the invention.

Fig. 1 is a sectional view through the turbine and afterburner.

Fig. 2 is a fragmentary sectional view on a larger scale showing the location of the rows of holes which function as a boundary layer energizing means.

Fig. 3 is a fragmentary view of a modification.

With reference to the drawing, the turbine from which the gas discharges into the afterburner includes a row of stationary nozzles 2 which guide the flow of hot gas over the blades 4 of the turbine rotor 6. The gas is then discharged into the annular path 7 defined between the outer diffuser wall 8 and the inner diffuser wall 10, the latter being the tailcone for the turbine. The walls 8 and 10 diverge from each other to provide the diffusing action which serves to reduce the rate of flow of air to a sufficient degree that combustion can take place further downstream in the combustion zone of the afterburner. The tailcone is shown as supported by radially extending rods 12 and 14 which position the tailcone concentrically to the outer wall 8. A streamlined fairing 16 may be provided over the rods where they extend through the gas path.

At a point downstream of the turbine where the gas velocity and pressure are suitable for combustion purposes, fuel from a manifold 18 is injected into the stream of gas through nozzles 20. Adjacent to and downstream of the nozzles are flameholders 22 of any suitable construction which serve to locate the combustion within the zone 24 directly downstream of the flameholders. The latter may be in the form of rings 26 which are V-shaped in cross section with the point of the V upstream. These rings may be suitably supported by radially extending rods 28.

At a point adjacent to the fuel nozzles and flameholders the outer wall 8 terminates and has connected thereto the converging outer wall 30 of the afterburner which extends from the downstream end of the wall 8 to the nozzle tip 32. The nozzle may have a device for varying its area depending upon whether the afterburner is operating or not and such mechanism is shown in general as a pair of eyelid-shaped members 34 which upon being rotated about the supporting pins 36 will be moved into a position to close partially the normal opening of the nozzle.

The structure above disclosed is not in itself the present invention but is shown for the purpose of depicting one mechanism with which the boundary layer energizing means is particularly useful. In accordance with the present invention the inner wall 10 of the gas path which, as above stated is the tailcone for the turbine, has axially spaced rows 40 and 42 of relatively small holes located adjacent to the upstream end of the tailcone. The rows 40 and 42 extend circumferentially around the tailcone and are preferably spaced far enough apart so that the holes will not overlap and will produce an imperforate wall portion between the adjacent rows as shown. The arrangement is such that gas from the gas path will flow into the downstream row 42 of holes and will flow out the upstream row 40. The holes of each row are preferably closely spaced circumferentially and the holes of adjacent rows are preferably staggered with respect to each other.

It will be apparent that, in a diffuser of the type defined between the walls 8 and 10, there is an increasing pressure gradient in a downstream direction such that the static pressure adjacent the downstream row 42 will be slightly higher than the static pressure in the gas path adjacent to the upstream row 40. This pressure differential will cause a flow in the direction of the arrows 44 which is substantially perpendicular to the wall surfaces and will function to energize the boundary layer to increase its flow in the same direction as the gas stream and will in effect produce trailing vortices projecting downstream from the upstream row of holes which will tend to energize the boundary layer for a substantial distance downstream from the rows of holes.

It will be apparent that the holes 40 and 42 are connected externally of the gas path to encourage the flow between the rows of holes. In the arrangement shown, the fluid connection between the rows of holes is provided by the hollow interior of the tailcone.

It may be advantageous in certain instances to provide a more direct flow path between the rows of holes. To accomplish this the arrangement may be as shown in Fig. 3 in which the spaced rows of holes are shown as applied to the outer wall 8' of an annular diffuser other than to the inner wall as in Fig. 1. In this arrangement the outer wall has spaced rows 40' and 42' of holes which extend circumferentially around the wall 8' and are axially spaced apart in the direction of the flow inside of the wall 8'. The fluid connection between the rows of holes is provided by a small annular chamber defined by a substantially U-shaped ring 46 which overlies the spaced rows of holes as shown and is located on the side of the wall 8' opposite to the side over which the fluid is flowing.

It is to be understood that the invention is not limited to the specific embodiment herein illustrated and described, but may be used in other ways without departure from its spirit as defined by the following claims.

I claim:

1. The combination with a gas turbine, a thrust nozzle downstream of the turbine, and outer and inner annular walls defining an annular gas passage extending downstream from the turbine toward the thrust nozzle, the outer wall constituting a duct connecting the turbine to the thrust nozzle, the adjacent surfaces of said inner and outer walls being substantially smooth and being spaced apart to define the passage, said inner and outer walls diverging from each other in a downstream direction such that the gas passage is of increasing cross-sectioned area in a downstream direction to produce a diffusing action in the passage, of two axially spaced but closely adjacent rows of holes in one of said walls, the holes in one row being staggered circumferentially with respect to the holes in the other row, the rows of holes being spaced from each other in the direction of gas flow through the passage far enough to provide an imperforate wall portion between the two rows, and means located on the side of said one wall opposite to the gas path and providing a fluid connection solely between said two rows of holes in order, as a result of the static pressure gradient which increases in a downstream direction as a result of the diffusing action, to produce an out-flow from the passage through the downstream row of holes and a return flow into the passage through the upstream row of holes thereby producing trailing vortices projecting downstream from the upstream row of holes for energizing the boundary layer.

2. The combination with a gas turbine, a thrust nozzle downstream of the turbine, and outer and inner annular walls defining an annular gas passage extending downstream from the turbine toward the thrust nozzle, the outer wall constituting a duct connecting the turbine to the thrust nozzle, the adjacent surfaces of said inner and outer walls being substantially smooth and being spaced apart to define the passage, said inner and outer walls diverging from each other in a downstream direction such that the gas passage is of increasing cross-sectioned area in a downstream direction to produce a diffusing action in the passage, of two axially spaced but closely adjacent rows of holes in one of said walls, said rows of holes being adjacent to the downstream side of the turbine, the holes in one row being staggered circumferentially with respect to the holes in the other row, the rows of holes being spaced from each other in the direction of gas flow through the passage far enough to provide an imperforate wall portion between the two rows, and means located on the side of said one wall opposite to the gas path and providing a fluid connection solely between said two rows of holes in order, as a result of the static pressure gradient which increases in a downstream direction as a result of the diffusing action, to produce an out-flow from the passage through the downstream row of holes and a return flow into the passage through the upstream row of holes thereby producing trailing vortices projecting downstream from the upstream row of holes for energizing the boundary layer.

References Cited in the file of this patent

UNITED STATES PATENTS

| 2,344,835 | Stalker | Mar. 21, 1944 |
| 2,487,588 | Price | Nov. 8, 1949 |
| 2,555,576 | Criqui | June 5, 1951 |
| 2,588,532 | Johnson | Mar. 11, 1952 |
| 2,594,042 | Lee | Apr. 22, 1952 |

FOREIGN PATENTS

| 439,805 | Great Britain | Dec. 6, 1935 |